Figure 1:
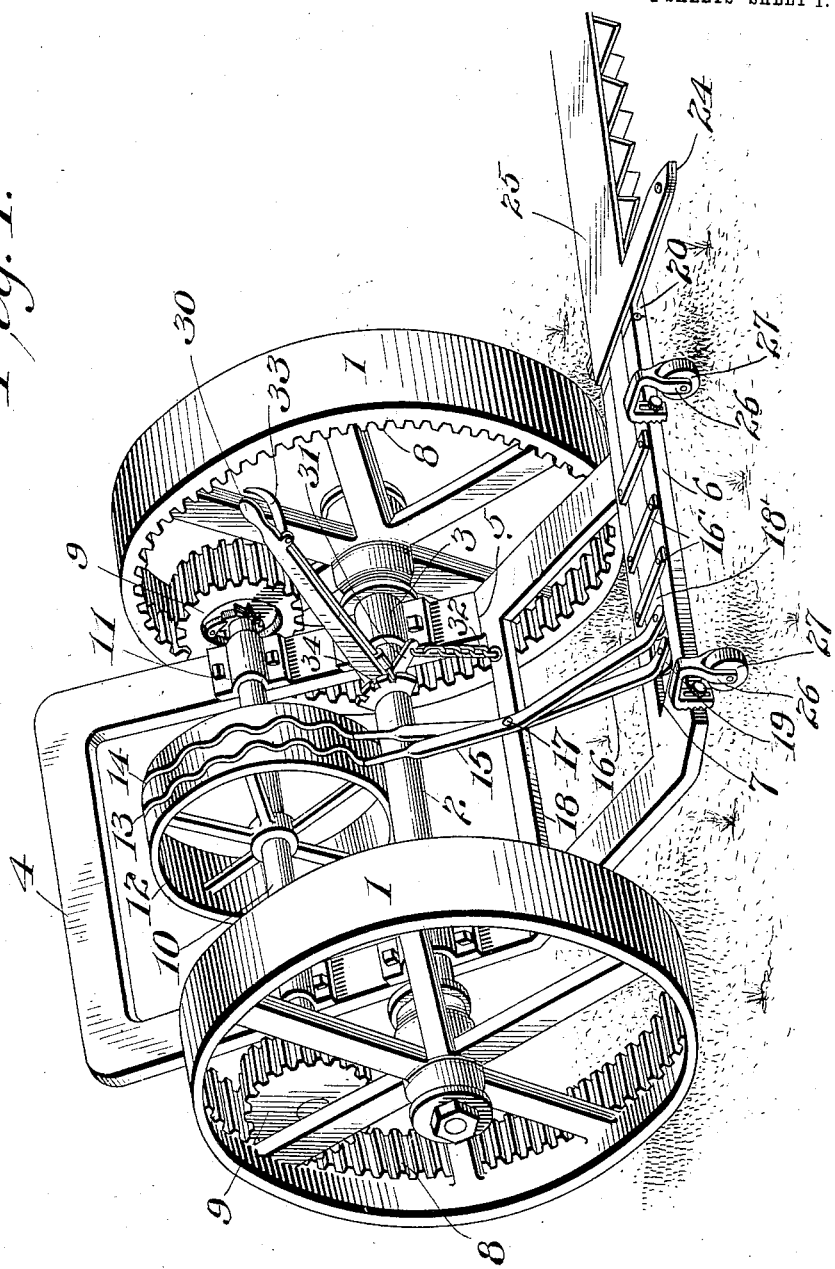

No. 891,684.
PATENTED JUNE 23, 1908.
I. GALLAGHER.
MOWER.
APPLICATION FILED JAN. 9, 1908.
2 SHEETS—SHEET 2.
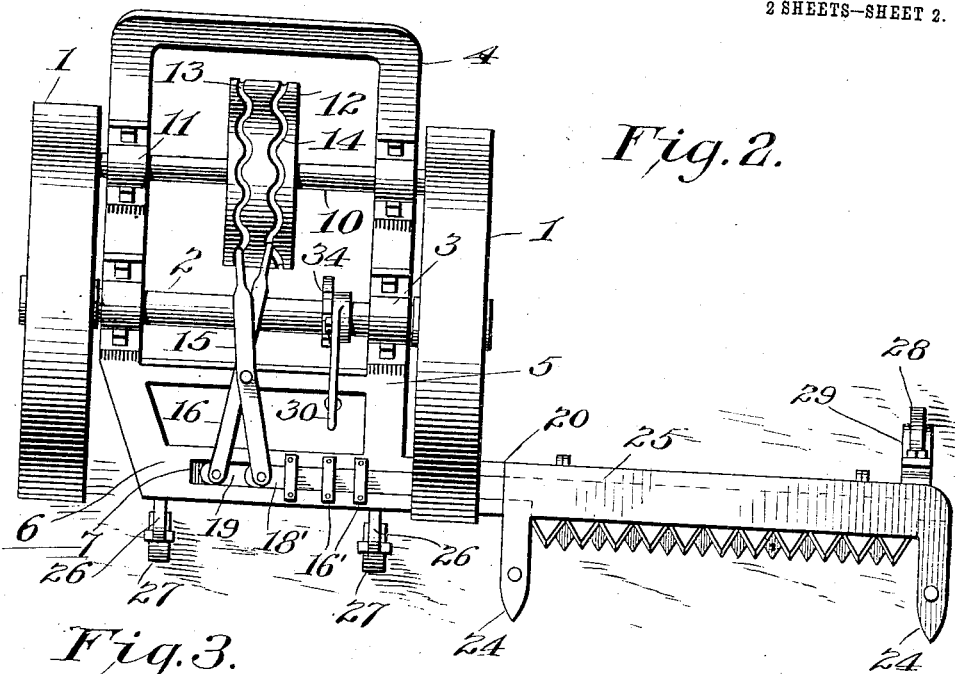
Fig. 2.
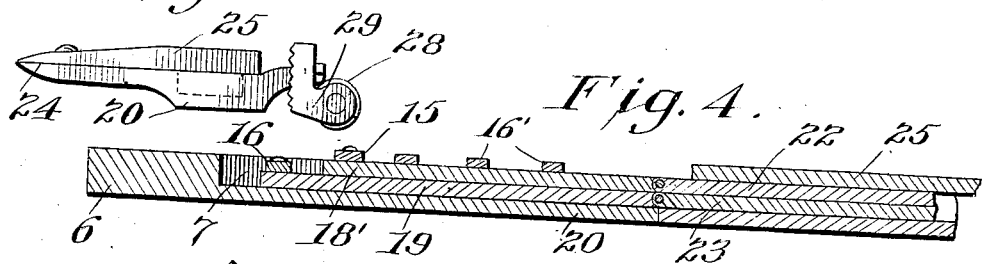
Fig. 3.
Fig. 4.
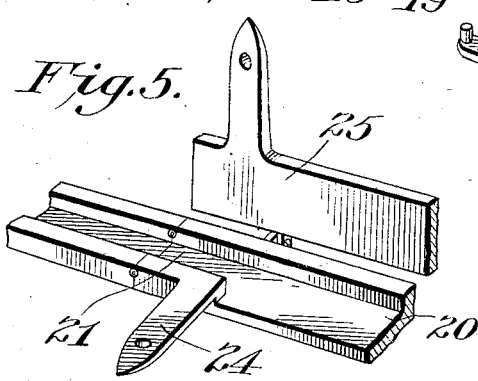
Fig. 5.
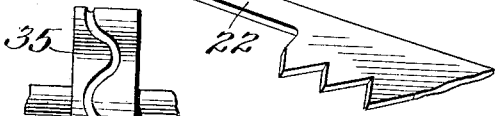
Fig. 6.
Fig. 7.
Witnesses
Inventor
Ireneaus Gallagher
By Joshua R. H. Potts
Attorney

UNITED STATES PATENT OFFICE.

IRENEAUS GALLAGHER, OF RIO, WISCONSIN.

MOWER.

No. 891,684.      Specification of Letters Patent.      Patented June 23, 1908.

Application filed January 9, 1908. Serial No. 410,025.

*To all whom it may concern:*

Be it known that I, IRENEAUS GALLAGHER, a citizen of the United States, residing at Rio, in the county of Columbia and State of Wisconsin, have invented certain new and useful Improvements in a Mower, of which the following is a specification.

This invention relates to mowers, and more particularly to that type of mowers employing a pair of reciprocating cutter bars, the object being to provide a mower which is so constructed that it can be used either as a field or lawn mower with equally as good results.

Another object of my invention is, to provide very novel means for adjusting the frame and for supporting the same, whereby the finger bar can be adjusted so as to cut the grass at any desirable height.

A further object of my invention is to provide a finger bar formed of two sections hinged together, between which are mounted the cutter bars, which are provided with the ordinary cutting blades, whereby the bars can be readily removed when it is desired to sharpen or replace a blade.

These objects are obtained by the novel arrangement and construction of parts hereinafter fully described and shown in the accompanying drawings in which:

Figure 1, is a perspective view of my improved mower, the finger bar being partly broken away. Fig. 2, is a top plan view of the same. Fig. 3, is an end view of the finger bar. Fig. 4, is a longitudinal section of the same. Fig. 5, is a detail perspective view of a portion of the frame and finger bar showing the upper section of the finger bar raised. Fig. 6, is a detailed perspective view of one of the cutter bars and pitmen rods, and, Fig. 7, is a plan view showing a modified form of cam wheel and oscillating levers.

In the drawings 1, indicates a pair of ground drive wheels mounted on a main axle 2, on which are mounted bearing plates 3, adjacent each wheel carrying a rectangular frame 4, bent as shown at 5, forming a forwardly extending portion having an outwardly projecting cross bar 6, which is provided with a longitudinal groove 7, forming a bearing, for the purpose hereinafter fully described.

The rims of the drive wheels are provided with internal gears 8, which mesh with pinions 9, loosely mounted on the ends of the transverse shaft 10, mounted in bearings 11, secured on the side bars of the frame 4. A ratchet connection is provided between the pinions 9 and the shaft and the shaft will be rotated in the same direction as the wheels of the mower are, when moved forwardly. A cam wheel 12, is secured centrally on the shaft 10, provided with spaced cam or zigzag shaped grooves 13 and 14, in its face, in which work the ends of oscillating actuating levers 15 and 16, pivotally mounted on a bolt 17, secured in a cross bar 18 of the frame 4. The oscillating levers being provided with angled lower ends, having eyes formed therein. The levers are crossed as shown, so as to cause the levers to move in opposite direction when the cam wheel is rotated, and it will be seen that as the mower is moved forward the cam wheel is rotated in the same direction, as the drive wheels and the levers 15 and 16 are oscillated by the levers following the cam grooves.

Arranged one upon the other in the bearing of the cross bar 6, of the frame, is a pair of flat pitmen rods 18' and 19, of different lengths, provided with outwardly projecting pins at their inner ends, adapted to fit in the eyes of the oscillating levers 15 and 16, the pitmen being held in their bearings by clips 16', which extend across the slot on the upper face of the cross bar.

Pivotally connected to the end of the cross bar 6, of the frame, is the lower section of a finger bar 20, which is also provided with a longitudinal groove 21, which registers with the groove of the cross bar, and is cut away as shown, forming a bearing in which are mounted one upon the other a pair of cutter bars 22 and 23, having the usual knives secured thereon, which extend forwardly from the finger bar. The cutter bars are pivotally connected at their inner ends to the respective pitmen rods, whereby when the pitmen rods are reciprocated by the oscillating levers, the cutter bars will also be reciprocated so as to make a shear cut, whereby the stalk of grain or grass will be severed. The finger bar 20, is provided with guard fingers only at its ends as shown at 24, and hinged to the rear edge of the finger bar is the upper section 25, of the cutter bar which is similar in shape, with the exception of the longitudinal groove, and is adapted to fold down upon the lower section, and be secured together by bolts passing through the guard fingers, so as to securely hold the cutter bars in position. It will be seen that the finger bar can be readily swung upwardly when not in use.

Adjustably mounted on the front edge of the cross bar 6 of the frame, is a pair of arms 26, carrying gage rollers 27, for supporting the frame, and the finger bar is also provided with gage rollers 28, carried by an arm 29, adjustably mounted thereon, for supporting the same in its desired position, so as to reduce the strain on the same.

Pivotally mounted on the axle 1, is a lever 30, provided with a bell crank 31, carrying a chain 32, which is connected to the cross bar 18 of the frame. The lever being provided with a hand lever 33, adapted to engage a segmental rack 34, secured to the axle 1, whereby the frame can be raised and lowered and locked in its adjusted position, so as to adjust the finger bar to cut the grass at the desired height. It of course being understood, that the gage rollers of the frame and finger bar are also adjusted, so as to form at the same time an additional support.

In the modifications shown in Fig. 7, I show a cam wheel 35, provided with a similar zigzag groove in which are mounted the ends of a pair of oscillating levers 36, which are of different lengths, so that one of the same will be in one portion of the groove, while the other is in another portion, thereby oscillating the levers.

In the drawings, I have not shown any means for pushing the mower, or drawing the same, it of course being understood that a handle or a tongue can be readily connected to the axle as desired.

From the foregoing description it will be seen that I have provided a mower which is very simple and cheap in construction, and one which is composed of very few parts, so arranged that they are not liable to get out of order by hard use.

Having thus described my invention what I claim as new and desire to secure by Letters Patent is:

1. A mower comprising a main axle provided with ground drive wheels, a frame pivotally supported by said axle, oscillating levers mounted on said frame, means carried by said frame and operated by said wheels, for actuating said levers, pitmen rods connected to said levers mounted in said frame, and a pivoted finger bar connected to the frame, carrying cutter bars pivotally connected to said pitmen rods.

2. A mower provided with horizontal pitmen rods and means for reciprocating said rods, a finger bar composed of upper and lower sections and pivotally connected to said mower, the lower section of which is provided with a bearing, cutter bars mounted in said bearings in alinement with said pitmen rods, and secured therein by the upper section, said cutter bars being pivotally connected to said pitmen rods.

3. A mower comprising an axle carrying drive ground wheels, provided with internal gears, a frame pivotally supported by said axle, a shaft carried by said frame provided with pinions meshing with said gears, a cam wheel mounted on said shaft, provided with spaced zigzag grooves, levers mounted on said frame, working in said grooves, pitmen rods mounted in bearings, formed in the frame, connected to said levers and a finger bar pivoted to the frame, provided with cutter bars pivotally connected to the said pitmen rods.

4. A mower comprising a main axle provided with drive wheels, a frame pivotally supported by said axle, provided with a forwardly extending portion, having an outwardly projecting cross bar, said bar being provided with a longitudinal groove forming a bearing, pitmen rods mounted in said bearings, one upon the other, a sectional finger bar pivoted to the end of said cross bar, provided with a registering groove, cutter bars mounted one upon the other in said groove of the finger bar, pivotally connected to said pitmen rods, and means operated by the drive wheels for reciprocating said pitmen rods.

In testimony whereof I have signed my name to this specification in the presence of two subscribing witnesses.

his
IRENEAUS × GALLAGHER.
mark

Witnesses:
L. A. Hanson,
H. S. Hendrickson.